United States Patent Office 3,117,848
Patented Jan. 14, 1964

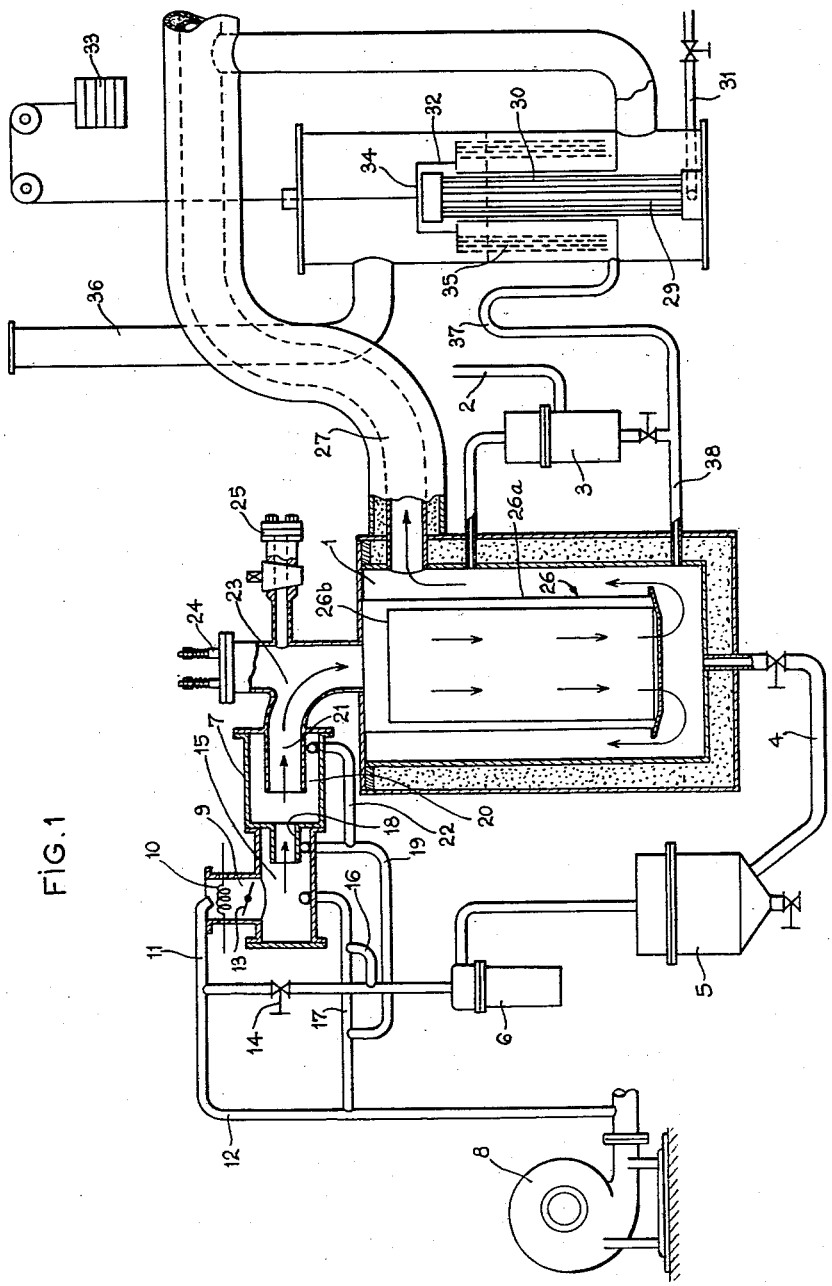

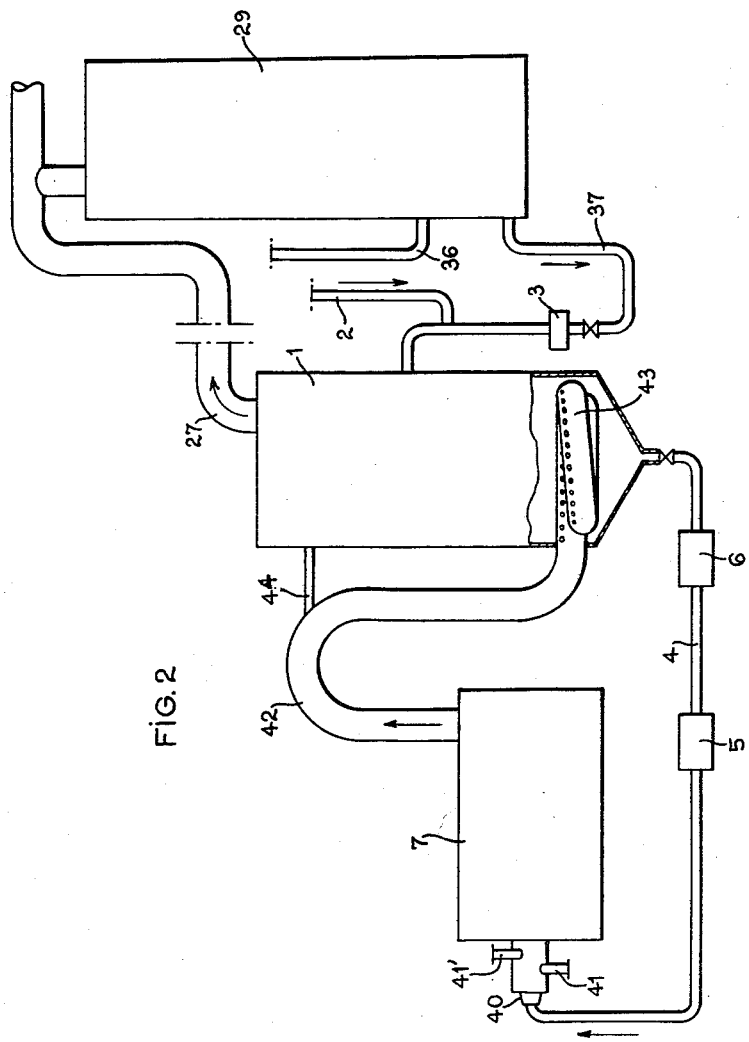

3,117,848
METHOD AND APPARATUS FOR GENERATING GAS UNDER CONSTANT CONDITIONS OF TEMPERATURE AND DELIVERY FROM FUEL OILS
Jacob Hammacher, 11 Hullenberweg, Bennekon, Netherlands, assignor of one-half to Societe pour la Construction d'Appareils a Gazeifier le Mazout (C.A.G.M.), Suresnes, France, a body corporate of France
Filed Apr. 11, 1960, Ser. No. 21,244
Claims priority, application France Mar. 30, 1956
8 Claims. (Cl. 48—102)

The present invention is concerned with a method and an apparatus for vaporizing fuel oils such as light fuels and fuels for domestic use to deliver a gaseous fuel to consumption apparatus located at a distance, the heat which is necessary for the vaporization of the fuel oil being produced by burning a part thereof.

This application is a continuation-in-part of my application, Serial No. 649,866 filed April 1, 1957 and abandoned after the filing of the present application.

The methods already known for producing a gaseous fuel from liquid fuels belong to two general types:

According to a first method, the hot burned gases generated by the combustion of a fraction of the liquid fuel are mixed with the pulverized or atomized liquid fuel, or forced through a tank containing said liquid fuel. In both cases, the high temperature of the burned gases and the presence of air and oxygen in said gases cause a slow combustion and a consequent cracking of the oil and the production of a permanent, uncondensable gas under a pressure which allows its delivery to the consumption devices. For instance, if the burned gases contain 2% to 3% of oxygen, cracking already begins at 300° C. whereas the temperature of the boiling point of the different fractions of the concerned oil varies from 190° to 360° C. The drawback of the above method consists in the formation of tar and coke which may obstruct the pipings and the holes of small sections provided in the burners of the consumption devices.

According to a second method, the heat of the burned gases is given up to the liquid fuel, directly or in a heat exchanger, under temperature conditions allowing a cracking to be avoided and a pure vaporization to be obtained. However, in the known plants of this kind, the transportation of the combustible vapors to the consumption places is effected by suction, either by mechanical suction means, or by means of compressed air fed to an injector and mixed with the oil vapors at the output of the vaporizing apparatus, the compressed air simultaneously serving as a carrier and as carburizing air. The method also involves several drawbacks:

First of all, the amount of air added to the oil vapors and necessary for carrying said vapors causes the temperature thereof to be lowered from 220° C. which is its initial value down to 120°. Due to the cooling, the vapors partly condense in the mixture and form droplets strongly reducing the speed of the combustion. Furthermore, at 120° C., the igniting of the mixture of the air and oil vapors becomes very difficult and the mixture cannot be ignited by the flame of a match and special igniting devices are required for that purpose. The same drawback is inherent to the method of transportation comprising mechanical suction means which also cause an excessive cooling of the combustion mixture. On the other hand, the mixture of air and oil-vapors is explosive and a danger of explosion may arise from a backfire towards the delivery piping and the vapor generator.

A first object of the present invention is to generate a perfectly inert gas for carrying the oil vapors to avoid cracking.

Another object of the invention is to generate a flow of a mixture comprising oil vapors and an inert gaseous carrier at a temperature allowing an easy igniting with the flame of a match.

Still another object of the invention consists in producing a combustible mixture comprising oil vapors and an inert gaseous carrier under constant temperature and pressure delivery conditions independently of the consumption.

With these and further objects in view, the method according to the invention broadly comprises the step of burning a part of the oil to be vaporized with an amount of compressed air just sufficient to provide complete combustion, whereby the burned gases contain practically no free oxygen whereas their $CO_2$ content reaches 14% to 15%, forcing said burned gases through the oil to be vaporized, the temperature of said burned gases at their entrance into the oil being regulated to a value which prevents a cracking of the oil and allows a mixture of oil vapors and burned gases at a temperature of the order of 220° C. to be obtained, delivering the mixture of oil vapors and burned gases under constant pressure and output conditions to the consumption apparatus, condensing the amount of oil vapors in excess over the consumption and return the unconsumed condensed oil into the process.

The invention is also concerned with an apparatus for carrying out the method defined above, which comprises a tank containing said oil, a burner arranged outside of said tank, a piping opening in the tank near the bottom thereof and connected to the burner, a pump arranged in said piping to suck the oil in the tank and to feed it to the burner through said piping. An air blower connected to said burner, means to feed constant amounts of oil and compressed air to said burner by said pump and said air blower, said amounts of oil and compressed oil being determined to produce burned gases, the $CO_2$ content of which reaches from 14% to 15%, an opening provided on the top of the tank and connected to the downstream end of the burner, a central vertical tube arranged in the tank and connected to the top thereof around said opening and opening at its lower end below the level of the oil, whereby the hot burned gases from the burner are forced under pressure into the oil to vaporize same, after having given up a part of their heat to the vapors evolving around the upper part of said central vertical tube, an outlet opening provided in the upper part of the tank, a discharge piping connected to said opening through which the mixture of oil vapor and of burned gases is discharged under pressure, a condenser connected to said discharge piping and provided with pressure responsive means to condense the vapors in excess over the consumption and with means to feed back to the tank the said condenser vapors.

As the auxiliary burner operates under constant conditions, it can be regulated once for all to insure a complete combustion, which would be impossible if the amount of oil and compressed air to the burner are variable in terms of the consumption of gas produced by the generator. However, the constant operating conditions of the auxiliary burner generating the heat necessary for vaporizing the fuel oil result in a constant output of oil vapors produced in the generator, which further necessitates the condensation of the unconsumed part of the combustible mixture and the return thereof to the oil containing tank.

By way of example, two embodiments of the invention are described hereafter and illustrated in sectional elevation in FIGS. 1 and 2 of the annexed drawing respectively.

The plant, according to the invention, includes a generator constituted by a heat-insulated tank 1, supplied with fresh fuel through a pipe 2, the level of the liquid in the tank being kept constant by means of a float regulator 3 controlling the supply. A pipe 4, connects the bottom of the tank 1, through a filter 5, with a pump 6 feeding oil to the heating device 7, which is also fed with compressed combustion air by a blower 8.

The heating device comprises an ignition chamber 9 in which is mounted an electric resistance 10 upon which falls, during the starting period, the fuel forced by the pump 6 in the pipe 11 to which is connected the air piping 12, leading from the blower 8. As soon as the ignition is started by the contact of oil with the incandescent resistance 10 which is separated from the remaining part of the burner 7 by a throttle valve 13, the arrival of the fuel in the ignition chamber 9 is stopped by a cock 14: the resistance 10 is cooled by the air flowing through the air piping 12 and is thereby prevented from being damaged by the heat produced in the adjacent combustion chamber 15 of the burner 7 in which the combustion of the fuel supplied by the pump 6 through the pipe 16 opening tangentially into the chamber 15 keeps on; the air piping 17 is connected with the pipe 16; this tangential intake of the air blows the liquid against the wall of the combustion chamber, generating thereby a turbulence favorable to the combustion. The combustion chamber 15 ends in a compartment having double walls, formed by an inner tube 18 which provides an annular chamber opening at the rear and in which opens a tangential air inlet 19; the secondary air arrives in the chamber 15 in the opposite direction to the flow of the flames, thereby preventing the flames from coming out of the combustion chamber 15 and contributing to the cooling of the outer wall of said chamber. Through the tube 18, the flame enters a second combustion chamber 20 shaped, like the first chamber, as a compartment with double walls, by an inner tube 21, a secondary air inlet opening tangentially in the annular space. Thanks to the turbulence thus produced inside the burner by the tangential inlets of an air moving in the opposite direction of the flames, the gases flowing out of the chamber 20 are entirely devoid of oxygen and of carbon monoxide, due to the complete combustion of the fuel, whereas the content of carbon dioxide reaches 14% to 15%.

The burned gases escaping from the burner 7 flow through an elbow passage 23 provided with a safety valve 24 and a control valve 25 and enter in a tube having double walls 26 immersed in the liquid fuel contained in tank 1. The double-walled tube 26 comprises an outer tube 26a extending downwardly from the top of the tank 1 and a spaced concentric inner tube 26b having an upper end spaced downwardly from the top of the tank but above the level of oil in the tank. The burned gases pass through the liquid, heating it and escape with the vaporized fuel through the insulated pipe 27 which feeds the consumption apparatus, the evolving mixture of oil vapors and burned gases having a mean temperature of 220° C. and being further heated up to 300° C. by the contact with the nonimmersed upper part of tube 26 and with the top wall of tank 1, as well as by the heat radiated by said parts of the generator.

If the production of the gaseous mixture is in excess in relation to the consumption, the pressure tends to increase in the pipe 27 and causes the exhaust of this excess of gas in a condenser 29 in which the gas and mixture enters from beneath in a cooler 30 fed with water through the tube 31 and a slidably arranged air-chamber 32, balanced by counterweights 33. The air-chamber 32 is constituted at the top by a dome 34 made of sheet-iron and by a cylindrical body 35 containing several concentric perforated sheet-irons; the burned gas by passing at an increased speed through the staggered perforations of the successive sheet-irons is separated from the oil droplets ejected upon the walls and flows out through the escape pipe 36. The condensed fuel fills normally the condenser 29 up to a level indicated in broken lines and controlled by the overflow 37.

If the flow of the gas to be condensed increases and thereby also the pressure in the condenser, the air chamber 32 is lifted out of the liquid and the surfaces of the perforated sheet-irons for the passage of the gas is increased, thus controlling the pressure of the gas in the pipings. The fuel, condensed anew, flows, through the overflow 37 and the pipe 38, towards the tank 1 of the generator.

One will easily understand that the apparatus according to the invention is able to work continuously and in a perfectly safe way.

According to the alternative form shown in FIG. 2, the plant also comprises an auxiliary burner 7 to which oil is fed from the bottom of tank 1 through filter 5 and pump 6 arranged on pipe 4. The burner comprises an oil injector 40 operating under a high pressure developed by pump 6 and two tangential air inlets 41, 41' connected to an air blower (not shown). The burned gases escaping from the burner 7 and which do not contain oxygen and carbon monoxide, are discharged by a piping 42 entering the tank 1 near its bottom below the level of liquid fuel maintained constant by the float regulator 3, said piping 42 ending by a perforated spiral 43 horizontally arranged in the tank 1, the hot gases being forced into the oil to be vaporized through the perforations of said spiral part 43 of piping 42. In order to avoid cracking, the length of the pipe 42 is determined to cause the burned gases to be cooled during their path and to enter the tank at a temperature comprised between 600 and 700° C.

As in the apparatus shown in FIG. 1, the mixture of oil vapors and burned gases evolving from the oil contained in tank 1 has a mean temperature of 220° C. In order to heat said mixture up to 300° C. before discharging same through pipe 27, a part of the burned gases from the burner 7 is directly injected in the upper part of tank 1 through a conduit 44 derived from the piping 42.

What I claim is:

1. A method for vaporizing without cracking fuel oils such as fuels for domestic use and light fuels to deliver a gaseous fuel to consumption devices located at a distance, which comprises the step of burning a part of the oil to be vaporized with an amount of compressed air just sufficient to provide complete combustion, whereby the burned gases contain practically no free oxygen whereas their $CO_2$ content reaches 14% to 15%, forcing said burned gases through the oil to be vaporized, the temperature of said burned gases at their entrance into the oil being regulated to a value which prevents a cracking of the oil and allows a mixture of oil vapors and burned gases at a temperature of the order of 220° C. to be obtained, delivering the mixture of oil vapors and burned gases under constant pressure and output conditions to the consumption apparatus, condensing the amount of oil vapors in excess over the consumption and returning the unconsumed condensed oil into the process.

2. A method for vaporizing without cracking fuel oils such as fuels for domestic use and light fuels to deliver a gaseous fuel to consumption devices located at a distance, which comprises the step of burning a part of the oil to be vaporized with an amount of compressed air just sufficient to provide complete combustion, whereby the burned gases contain practically no free oxygen whereas their $CO_2$ content reaches 14% to 15%, forcing said burned gases through the oil to be vaporized, the temperature of said burned gases at their entrance into the oil being regulated to a value which prevents a cracking of the oil and allows a mixture of oil vapors and burned gases at a temperature of the order of 220° C. to be obtained, reheating the mixture of burned gases and oil vapors thus obtained up to 300° C. by a heat exchange with the hot burned gases on their path to the oil through which they are forced thereafter, delivering the mixture of oil vapors and burned gases under constant pressure and output conditions to the consumption apparatus, condensing the amount of oil vapors in excess over the consumption and returning the unconsumed condensed oil into the process.

3. A method for vaporizing without cracking fuel oils such as fuels for domestic use and light fuels to deliver a gaseous fuel to consumption devices located at a distance, which comprises the step of burning a part of the oil to be vaporized with an amount of compressed air just sufficient to provide complete combustion, whereby the burned gases contain practically no free oxygen whereas their $CO_2$ content reaches 14% to 15%, forcing said burned gases through the oil to be vaporized, regulating the temperature of said burned gases at their entrance into the oil to a value which prevents a cracking of the oil and allows a mixture of oil vapors and burned gases at a temperature of the order of 220° C. to be obtained, reheating the mixture of burned gases and oil vapors thus obtained up to 300° C. by directly injecting into said mixture a part of the hot burned gases, delivering the mixture of oil vapors and burned gases under constant pressure and output conditions to the consumption apparatus, condensing the amount of oil vapors in excess over the consumption and returning the unconsumed condensed oil into the process.

4. A method for vaporizing without cracking fuel oils such as fuels for domestic use and light fuels to deliver a gaseous fuel to consumption devices located at a distance, which comprises the step of burning a part of the oil to be vaporized with an amount of compressed air just sufficient to provide complete combustion, whereby the burned gases contain practically no free oxygen whereas their $CO_2$ content reaches 14% to 15%, forcing said burned gases through the oil to be vaporized, the temperature of said burned gases at their entrance into the oil being regulated to a value which prevents a cracking of the oil and allows a mixture of oil vapors and burned gases at a temperature of the order of 220° C. to be obtained, delivering the mixture of oil vapors and burned gases under constant pressure and output conditions to the consumption apparatus, condensing the amount of oil vapors in excess over the consumption, controlling the amount of condensed oil vapors by the overpressure of the delivered mixture and returning the unconsumed condensed oil into the process.

5. Apparatus for vaporizing fuel-oils such as fuels for domestic use and light fuels, to deliver a gaseous fuel under constant pressure and delivery conditions to consumption devices located at a distance from said apparatus, which comprises a tank containing said oil, means for supplying oil to said tank, means for maintaining the oil in said tank at a substantially constant level, a burner arranged outside of said tank, a piping opening in the tank near the bottom thereof and connected to the burner, a pump arranged in said piping to suck the oil in the tank and to feed it to the burner through said piping, an air blower connected to said burner, means to feed constant amounts of oil and compressed air to said burner by said pump and said air blower, said amounts of oil and compressed air being determined to produce burned gases containing substantially no free oxygen and the $CO_2$ content of which is from 14% to 15%, an opening provided on the top of the tank and connected to the downstream end of the burner, a central double walled vertical tube arranged in the tank and connected to the top thereof around said opening and opening at its lower end below the level of the oil, whereby all of the hot burned gases from the burner are forced under pressure into the oil to vaporize same after having given up a part of their heat to the vapors evolving around the upper part of said central vertical tube, an outlet opening provided in the upper part of the tank outside said central vertical tube, a discharge piping connected to said opening through which the mixture of oil vapors and of burned gases is discharged under pressure to said consumption devices, a condenser connected to said discharge piping to condense the vapors in excess over the consumption and with means to feed back to the tank the said condenser vapors and means responsive to the pressure in said discharge piping for varying the rate of condensation of said vapors by said condenser in accordance with the pressure in said discharge piping to maintain said pressure substantially constant despite variations in the rate of consumption of said mixture by said consumption devices.

6. Apparatus for vaporizing fuel oils such as fuels for domestic use and light fuels to deliver a gaseous fuel under constant pressure and delivery conditions to consumption devices located at a distance from said apparatus which comprises a tank containing said oil, means for supplying oil to said tank, means for maintaining the oil in said tank at a substantially constant level, a burner arranged outside of said tank, a piping opening in the bottom thereof and connected to the burner, a pump arranged in said piping to suck the oil in the tank and to feed it to the burner through said piping, an air blower connected to said burner, means to feed constant amounts of oil and compressed air to said burner by said pump and said burner, said amount of oil and air being determined to produce burned gases containing substantially no free oxygen and the $CO_2$ content of which is from 14% to 15%, a lateral opening provided in the tank near its bottom, a piping connected to the downstream end of the burner, projecting inside the tank through said lateral opening and having its end arranged in the form of a perforated horizontal spiral under the level of oil in said tank, whereby the hot burned gases from the burner are forced through the perforations into the oil to vaporize same, a second piping having a smaller section than the first and having an end also connected to the downstream end of the burner and its other end projecting in the upper part of the tank, the amount of hot gases forced through said second piping being determined to raise the temperature of the evolving mixture of oil vapors and burned gases up to 300° C., an outlet opening provided in the upper part of the tank, a discharge piping connected to said opening through which the mixture of oil vapors and burned gases is delivered under pressure to the consumption devices, a condenser connected to said discharge piping and provided with means to condense the vapors in excess over the consumption and with means to feed to the tank the said condensed vapors and means responsive to the pressure in said discharge piping for varying the rate of condensation of said vapors by said condenser in accordance with the pressure in said discharge piping to maintain said pressure substantially constant despite variations in the rate of consumption of said mixture by said consumption devices.

7. Apparatus according to claim 5 in which said double walled tube in said tank comprises a tube extending downwardly from the top of said tank and a spaced concentric tube having an upper end spaced downwardly from the top of said tank but above the level of oil in said tank.

8. Apparatus for vaporizing fuel-oils such as fuels for domestic use and light fuels, to deliver a gaseous fuel under constant pressure and delivery conditions to consumption devices located at a distance from said apparatus, which comprises a tank containing said oil, means for supplying oil to said tank, means for maintaining the oil in said tank at a substantially constant level, a burner arranged outside of said tank, a piping opening in the tank near the bottom thereof and connected to the burner, a pump arranged in said piping to suck the oil in the tank and to feed it to the burner through said piping, an air blower connected to said burner, means to feed constant amounts of oil and compressed air to said burner by said pump and said air blower, said amounts of oil and compressed air being determined to produce burned gases containing substantially no free oxygen and the $CO_2$ content of which is from 14% to 15%, conduit means for conveying said burned gases from said burner and introducing them into the lower portion of said tank below the oil level therein whereby all the hot burned gases from the burner are forced under pressure into the oil in said tank to vaporize said oil, means for applying heat to the vapor thus produced to raise the temperature of said vapor to a selected value, an outlet opening provided in the upper part of the tank, a discharge piping connected to said opening through which the mixture of oil vapors and of burned gases is discharged under pressure to said consumption devices, a condenser connected to said discharge piping to condense the vapors in excess over the consumption and with means to feed back to the tank the said condenser vapors and means responsive to the pressure in said discharge piping for varying the rate of condensation of said vapors by said condenser in accordance with the pressure in said discharge piping to maintain said pressure substantially constant despite variations in the rate of consumption of said mixture by said consumption devices.

References Cited in the file of this patent

UNITED STATES PATENTS

| | | |
|---|---|---|
| 1,256,186 | Ver Planck | Feb. 12, 1918 |
| 1,613,016 | Brandt | Jan. 4, 1927 |
| 1,716,433 | Ellis | June 11, 1929 |
| 2,079,586 | Atwell | May 4, 1937 |
| 2,109,743 | Faverty et al. | Mar. 1, 1938 |
| 2,123,884 | Faverty | July 19, 1938 |
| 2,586,416 | Buckley | Feb. 19, 1952 |